May 31, 1938.  W. S. LEFFLER  2,119,334
SELF AFFIXING AND SELF TIGHTENING CONNECTION
FOR ROTATING AND ROTATED MEMBERS
Filed Aug. 16, 1934  2 Sheets-Sheet 2
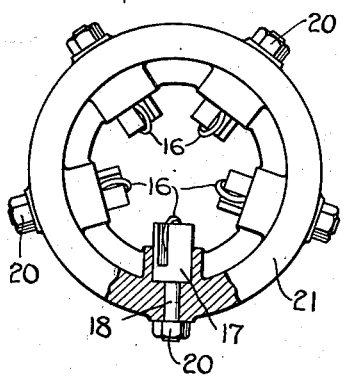
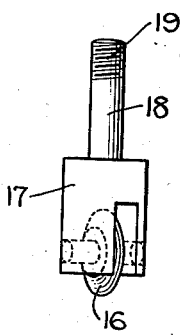
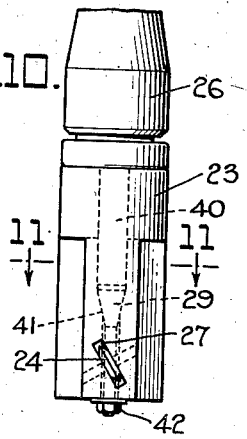
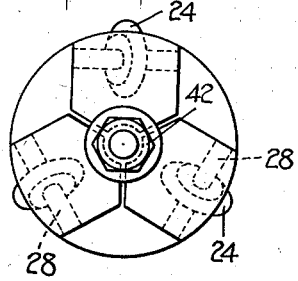
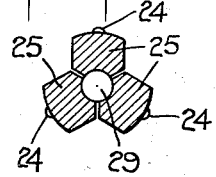
INVENTOR
William S. Leffler
BY
HIS ATTORNEY Patented May 31, 1938

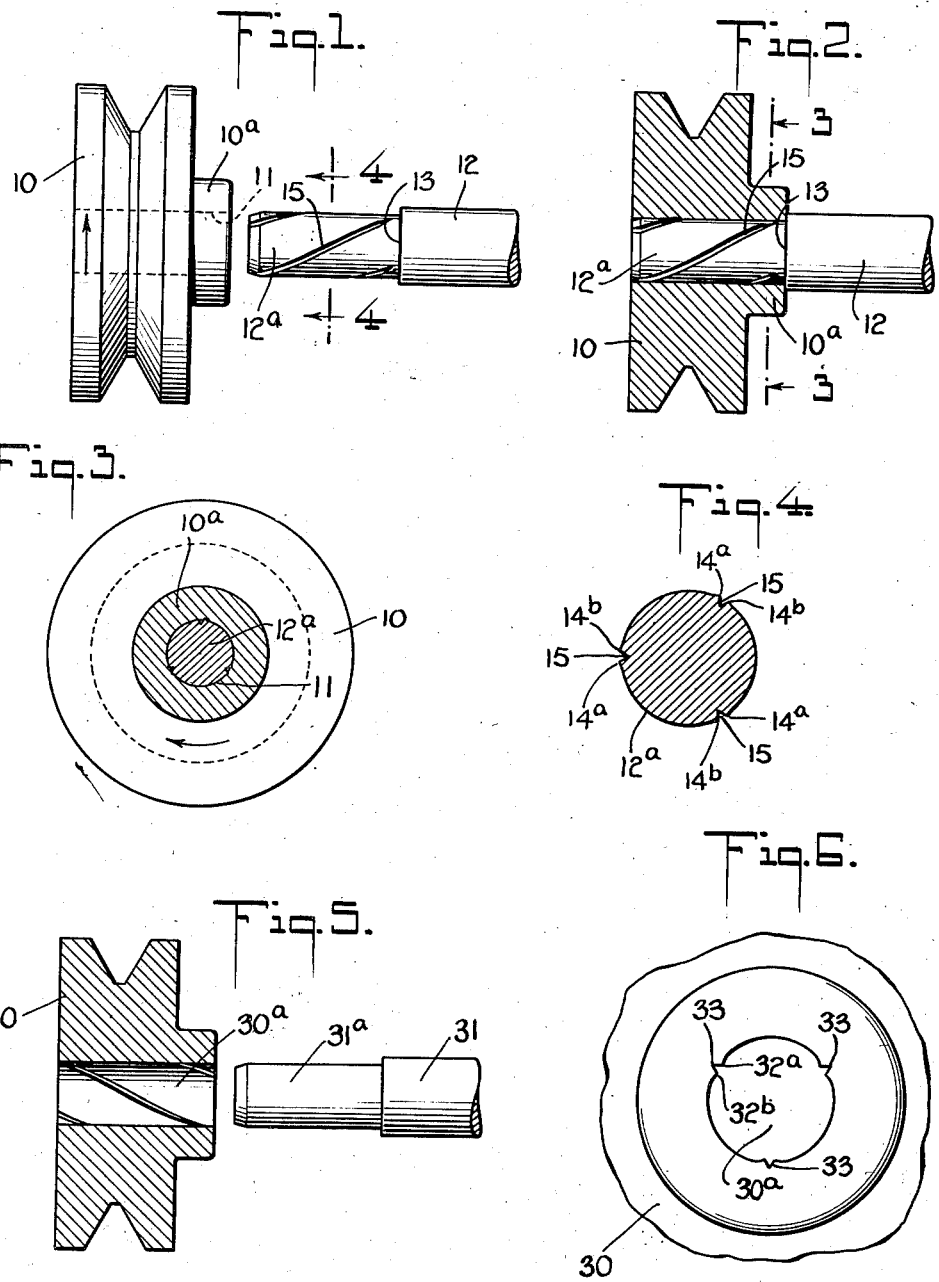

2,119,334

UNITED STATES PATENT OFFICE 2,119,334

SELF-AFFIXING AND SELF - TIGHTENING CONNECTION FOR ROTATING AND ROTATED MEMBERS

William S. Leffler, New York, N. Y.

Application August 16, 1934, Serial No. 740,143

1 Claim. (Cl. 287—53)

My invention relates to connection means for interconnecting rotating and rotated members relative to one another.

In general, my invention comprises the assembly of a rotating member and a rotated member, one of such members being provided with a cylindrically faced recess for receiving a cylindrically faced portion of the other member, and helical means interconnecting the rotating member and the rotated member, such helical means being formed on one of the stated cylindrical faces.

More particularly, the helical means is afforded by displacement of the metal or other material of the cylindrical face of the portion received within the cylindrical recess, such displacement being conveniently had by the formation of a plurality of grooved incisions by the employment of suitable incising tools, whereby displacement of the metal or other material ensues at both sides of the intervening groove, thus giving rise to effectively enlarged diametrical dimensioning.

Preferably, the direction of extension of the helical displacements is coincident with the direction of rotation of the rotating member, thus imparting the characteristic of self-tightening to the interconnection.

In the assembly of a shaft and a pulley, the helical means may be applied either to the end of the shaft received within the opening of the pulley, or upon the cylindrical face of the opening of the pulley. It is advantageous to reduce the portion of the shaft received within the opening of the pulley or otherwise to provide a shoulder for limiting the movement of the boss of the pulley relative to the shaft.

Further features and objects of the invention will be more fully understood from the following detail description and the accompanying drawings, in which Fig. 1 is an exploded view in side elevation showing one type of application of my invention to a rotating pulley and a rotated shaft.

Fig. 2 is a vertical central elevation, illustrating the stated rotating and rotated members interconnected, pursuant to my invention.

Fig. 3 is a sectional elevation on line 3—3 of Fig. 2.

Fig. 4 is a sectional elevation on line 4—4 of Fig. 1.

Fig. 5 is an exploded view, partly in vertical central section and partly in elevation, illustrating another type of embodiment of my invention.

Fig. 6 is an end elevation, illustrating another type of embodiment of my invention.

Fig. 7 is an elevation, partly in central section, of a tool for effecting incisions on the surface of a shaft or other cylindrical member. Fig. 8 is a detail elevation of the inner end of an individual tool box and its incising element, illustrated in Fig. 7. Fig. 9 is a side elevation of an individual tool box, shown in Fig. 7, removed from the tool.

Fig. 10 is a side elevation of a tool applicable for effecting incisions on the inner face of the cylindrical recess, such as is illustrated in Figs. 5 and 6 with respect to a driving pulley. Fig. 11 is a sectional elevation on line 11—11 of Fig. 10. Fig. 12 is an elevation of the incising end of the tool shown in Fig. 10, on an enlarged scale.

Referring to the form of embodiment of my invention shown in Figs. 1, 2, 3, and 4, the pulley 10 is illustrated as typical of a driving member, such driving member being provided with a suitable, cylindrically faced recess 11. Incidentally, the driving member 10 is of the belt driven type. The boss of the pulley 10 is indicated at 10a.

The driven member is illustrated in the form of a shaft 12, its end portion 12a being cylindrically faced and of proper diameter to be received within the cylindrically faced recess 11 of the driving member 10.

Preferably, the end 12a of the driving member is provided with a shoulder 13 or equivalent, for positively limiting the extent of reception of the driven member within the driving member. As appears more fully hereinafter, the shoulder 13, formed by grinding or otherwise shaping the shaft end 12a of a reduced diameter, may be replaced by projections of the metal or other material of the driven member 12, as by displacement at preferably two or more symmetrical locations, or equivalent procedure.

My invention is carried out by subjecting the end 12a of the driven member 12 to incisions to thereby form sets of displacements, see 14a, 14b, of the metal or other suitable material of the end 12a, such displacements being helically arranged, thus giving rise to effectively enlarged diametrical dimensioning of the otherwise cylindrically smooth face of the end 12a of the driven member. Such sets of displacements are preferably symmetrically disposed relative to one another.

Any suitable means for effecting such helically arranged displacements may be employed. An advantageous manner of producing such displacements is by forming grooves, see 15, as by means of bevel edged rollers.

In Figs. 7, 8, and 9, I illustrate a suitable displacement effecting tool, comprising in this instance five such bevel edged rollers, respectively designated 16, each said bevel edged roller being mounted on an individual shaft which is freely rotatively mounted in bearing openings on opposing sides of the forked end of its tool box 17; the stud 18 of each tool box extends longitudinally thereof and is threaded at its end 19 for receiving a tightening nut 20. The tool boxes 17 are placed respectively within the cylindrically faced recesses 20 of the tool holding frame 21. By reason of the effective contour of the tool holder 21, and the respective effective lengths of the tool boxes 17, and substantial identity of contour of the beveled edges of the rollers 16, these beveled edges are located about a substantially equal "radius" with respect to the central opening of the stated tool, through which central opening the end 12a, for instance, is forced.

The forming of such grooved displacements 14a, 14b, by the stated tool 21, is conveniently carried out by means of an arbor press, as will be understood by those skilled in the art.

By the above or equivalent procedure, the displacements 14a, 14b extend helically beyond the normal cylindrical face of the portion 12a of the driven member 12. Such end 12a, provided with the stated helically provided means, is forced under pressure into and within the cylindrically faced recess 10a of the driving member 10.

From my observations of the results had in carrying out my invention, the formation of the displacements 14a, 14b, gives rise to enlargements of diameter of the immediately adjacent originally cylindrically contoured face portions of the face 12a, the extent of such enlargements being predetermined by the selection of the original diameter of the stated portion 12a and the extents of the incisions.

In the forcing of the driving and driven members relative to one another to effect the stated inter-connection, partial rotation is imparted to one of the stated members, arising by reason of the helical disposition of the stated interconnecting means. Accordingly, it is preferable to direct the sets of helically extending connecting means in the direction of rotation of the driving member, which relationship in conjunction with the stated shoulder 13, or equivalent means for limiting the axial displacement of the driving member relative to the driven member, affords to my interconnecting means the function of self-tightening.

Another type of embodiment of my invention is illustrated in Figs. 5 and 6. In the embodiment shown in Figs. 5 and 6, the driving member is indicated by a pulley 30 and the driven member by a shaft 31. In this type of embodiment, the cylindrical face of the recess 30a is provided with my helically arranged interconnecting means, namely in the form of sets of helically extending displacements 32a, 32b, disposed on opposing sides of helically extending grooves 33. The stated sets of displacements 32a, 32b, and the helically extending grooves 33 correspond to the hereinabove described sets of displacements 14a, 14b and groove 15. In the type of the embodiment shown in Figs. 5 and 6, the end 31a of the rotated member, i. e., shaft 31, is cylindrical.

Figs. 10 and 11 illustrate one form of instrumentality for effecting the stated sets of displacements 32a, 32b and groove 33, such instrumentality comprising in essence a composite tool holder 23, in this instance arranged to incise three sets of the stated displacements, viz., by the three bevel edged rollers 24, respectively mounted in the three legs 25, integrally or otherwise rigidly extending from the body of the tool holder 23. The tool holder 23 is freely rotatably mounted, as by a ball bearing in a head 26, or equivalent, adapted to be placed in the chuck or head of an arbor press or the like.

Each bevel edged roller 24 is located within suitable slots 27 and mounted on a shaft 28, freely rotatively mounted in suitable bearing openings; the axes of the bearing openings and the inclination of the slots 27 relative to the horizontal and the vertical are determined by the pitch of the respective sets of displacements 32a, 32b and groove 33, effected by the stated rollers 24, upon the vertical movement under pressure of the tool holder 23 into and through the recess 30a of the driving member 30.

In such movement of formation of the sets of displacements 32a, 32b and groove 33, relative rotative movement takes place between the tool holder 23 and the pulley or other driving member 20.

The tool holder 23 is illustrated as provided with adjusting means for setting varied effective radii, within a range, of the bevel edged rollers 24, namely, by displacements of the respective legs 25 relative to one another had by downward and upward setting of the frusto-conical head 29 of the adjusting rod 40, the head 29 coacting with conical faces 41 of the respective legs 25, whereby upon downward displacement of the adjusting rod 40, the conical head 29 is forced against the conical faces 41, thus spreading the respective legs 25 outwardly by forces opposing the resiliency of the material of the respective legs 25. Tool steel or other suitable resilient material may be employed for the tool holder 23. The positioning of the adjusting rod 40 is set by means of the indicated nut 42 or equivalent.

From the above, it appears that my invention affords a simple interconnection between two members, and particularly members in rotative or turning relation to one another, whereby upon applying a torque to one member the torque is effectively transmitted to the other member.

My invention obviates the various accepted and prior art practices of pin and slot connections, key and keyway, spline and spline way, and the like, all of which necessitate parts additionally to the rotating and rotated members, and appurtenant operations to prepare and complete the assembly.

Pursuant to my invention, the rotatively and rotated members may be disconnected, for inspection, repair or replacement when desired, by mere pull of one member in a direction from the other.

The symmetrical relationship of the sets of displacements affords self-centering of the rotating and rotated members relative to one another. This is true, irrespective of the number of occasions of assembly and disassembly of the members, proper material and proper elasticities of the selected material insuring the maintenance of the interconnection.

The incising rollers may be varied in number and/or pitch of helix as may be desirable in the highly numerous fields of application of my invention, the resulting incisions at low angular pitch extending in substantially rectilinear, parallel directions lengthwise of the shaft or other driven member. In certain types of uses, a single helically extending incision may be employed, the pitch of which is selected in accordance with torque requirements.

I claim:

In a connection between a driving member and a driven member, the driving member being provided with a substantially cylindrically faced recess of substantially uniform diameter throughout, the driven member being provided at one end with a substantially cylindrically faced portion of substantially uniform diameter throughout adapted to be normally received within said cylindrically faced recess, said connection having means for relatively stationarily inter-connecting the driving member with respect to the driven member comprising sets of parallel helically arranged ridges on one of the cylindrical faces of the stated recess and the stated therein received portion, the driven member being provided with means for limiting the movement of the driving member axially relative thereto when forced thereon, the said ridges being adapted to form grooves in the other smooth cylindrical face when the members are forced together, the angular direction of extension of said helical ridges being in the direction of rotation of the driving member whereby force applied to the driving member tends to tighten its connection with said driven member.

WILLIAM S. LEFFLER.